United States Patent

[11] 3,596,759

| [72] | Inventors | John P. King |
| | | North Haven; |
| | | James M. Kowolenko, Jr., Uncasville; |
| | | Ralph K. Safford, Guilford, all of, Conn. |
| [21] | Appl. No. | 864,462 |
| [22] | Filed | Oct. 7, 1969 |
| [45] | Patented | Aug. 3, 1971 |
| [73] | Assignee | The Alfred B. King Company |
| | | North Haven, Conn. |

[54] PROCESS FOR RECLAIMING CONSTITUENTS OF CONCRETE
12 Claims, 3 Drawing Figs.

[52] U.S. Cl. .................................................. 209/2,
     209/13, 209/173, 209/269, 209/315
[51] Int. Cl. .................................................. B03b 7/00,
     B03b 3/00
[50] Field of Search .......................................... 209/2, 293,
     452, 235, 234, 289, 268, 269, 17, 13, 290, 315,
     173, 18, 314, 162, 163, 311, 1, 257, 259, 353;
     210/523; 241/14

[56] References Cited
UNITED STATES PATENTS

| 467,158 | 1/1892 | Coplen | 209/210 |
| 1,131,478 | 3/1915 | Custer | 209/17 X |
| 1,183,805 | 5/1916 | Downerd | 209/268 |
| 1,829,544 | 10/1931 | Schilling | 210/523 X |
| 2,942,731 | 6/1960 | Soldini | 209/293 |
| 2,983,378 | 5/1961 | Milkemeier | 209/270 |
| 3,165,465 | 1/1965 | Ray | 209/5 X |
| 3,278,022 | 10/1966 | Moeschler | 209/2 |

*Primary Examiner*—Frank W. Lutter
*Assistant Examiner*—Robert Halper
*Attorney*—Delio and Montgomery ABSTRACT: A process for reclaiming sand and gravel from a fluid concrete mixture, comprising adding water to the mixture to form a slurry and transferring the slurry to at least one gravel screen for separating the gravel therefrom and allowing the sand and cement slurry to pass therethrough. The sand and cement slurry is then transferred to a sand screen for separating the sand from the slurry and permitting the cement slurry to flow through The cement is separated from the slurry by settling in a basin or tank and the clear water is recycled so that it may be added to the fluid concrete mixture being processed, or the water may be discarded. The gravel and sand are transferred by conveyor from their respective screens to storage bins for use in preparing concrete.

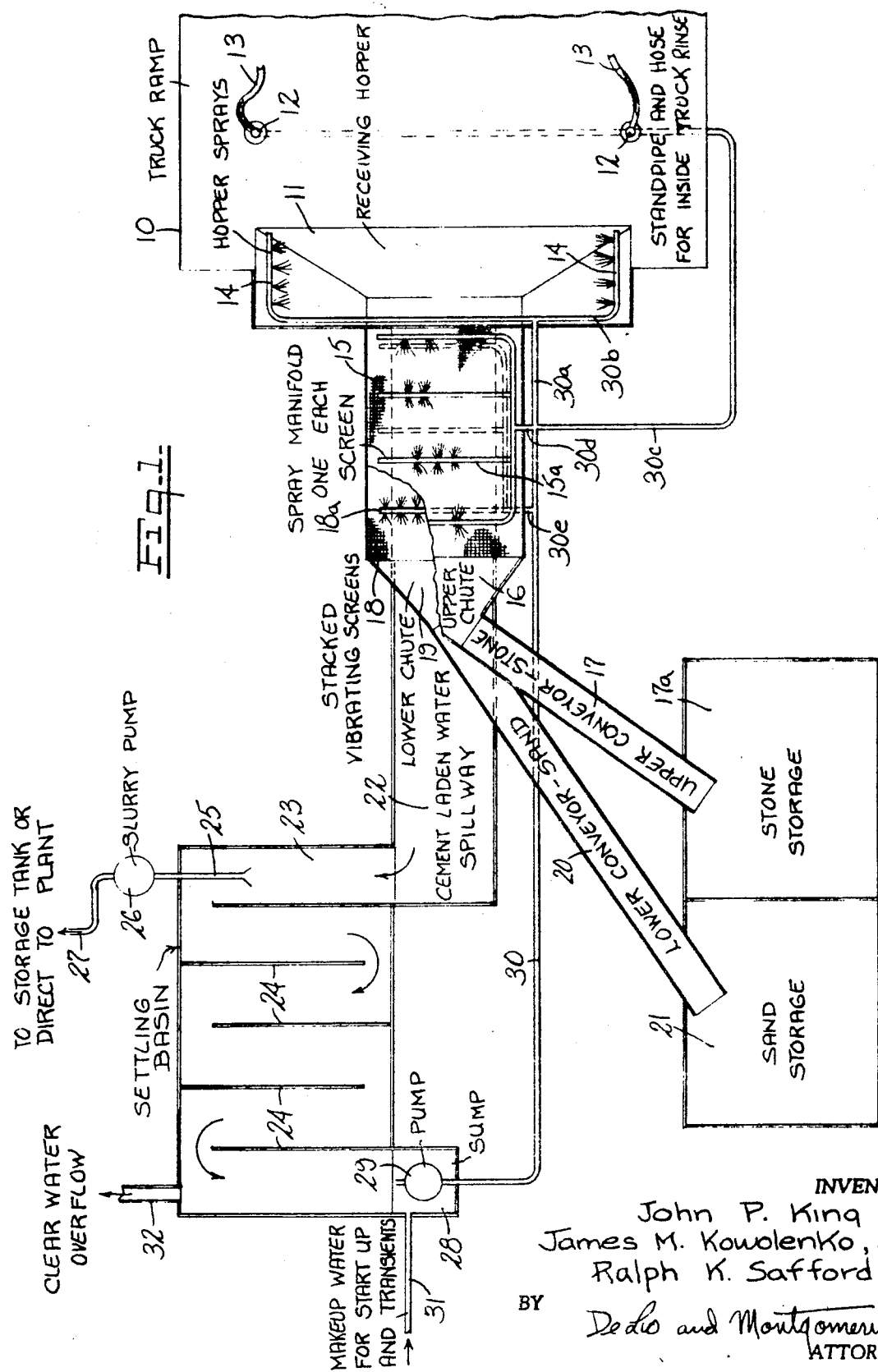

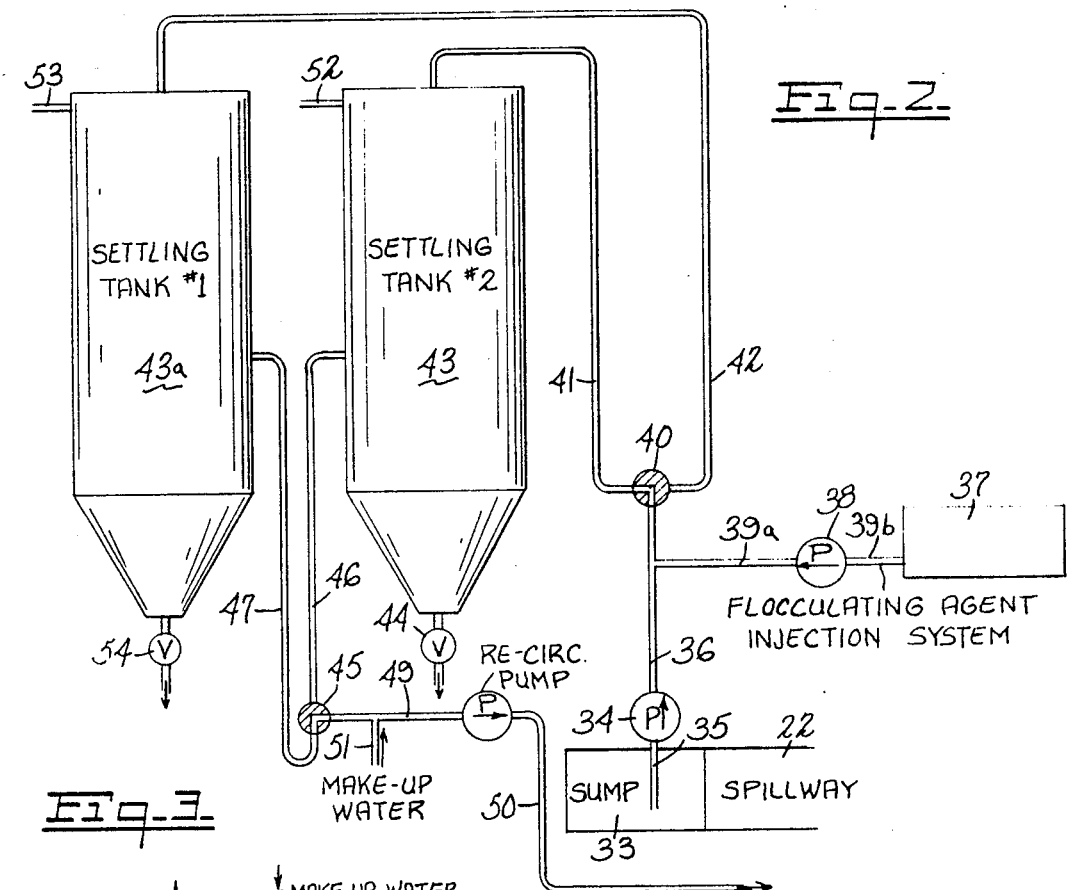
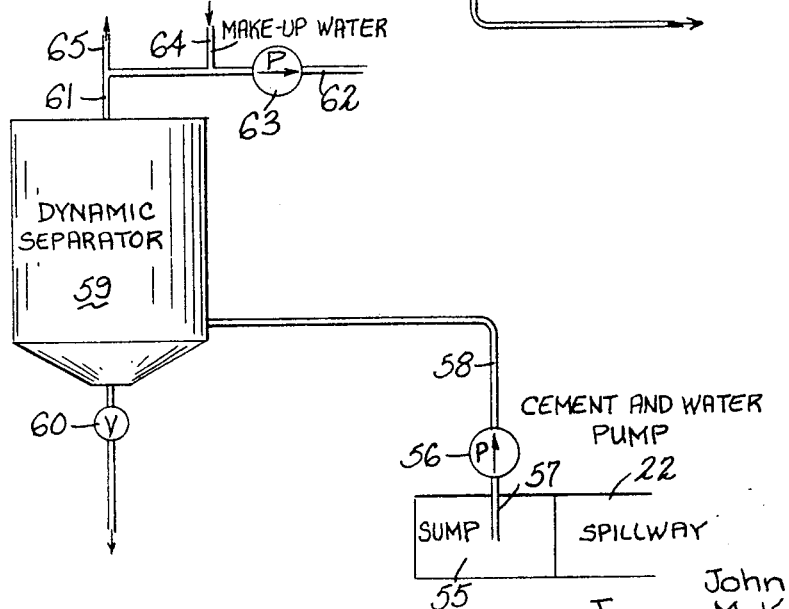

PROCESS FOR RECLAIMING CONSTITUENTS OF CONCRETE

This invention relates to a process for reclaiming fluid concrete and more particularly to a process for reclaiming sand, gravel and cement from fluid concrete.

As is well known, concrete is prepared by mixing cement, gravel, sand and water, in various proportions. The cement, gravel and sand are mixed and proper amounts of water are added to the dry mixture to form the final concrete mixture. Since the addition of water starts the hydration of the cement and the setting of the concrete, the concrete mixture must be poured within a certain time period after the initial addition of water. In most cases, the concrete mixture must be poured within several hours after the initial addition of water to the concrete, in accordance with the Federal and State Building Codes. After this time period, the concrete has set to the point where, if it is poured, the cured concrete will not have the requisite tensile and other strengths to meet Federal and State regulations.

In order to understand the setting of concrete, it is necessary to analyze the curing of the cementitious products in the concrete, which curing causes the concrete to set. Concrete is set or cured by the addition of water to the cement to form hydrates. The four basic reactions involved in the hydration of cement are the hydration of (1) tricalcium aluminate, (2) tetracalcium aluminoferrate, (3) tricalcium silicate, and (4) dicalcium silicate, which are interrelated as follows:

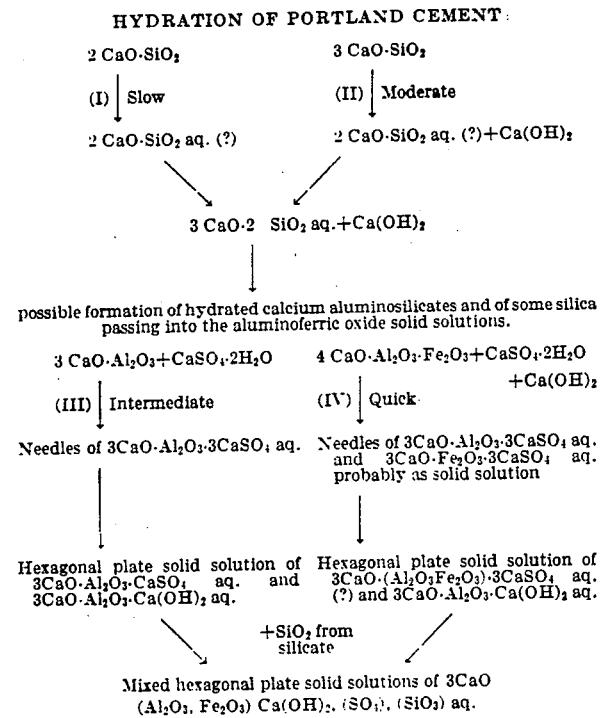

The tricalcium aluminate reaction (III) and the tetracalcium aluminoferrate reaction (IV) go to completion quickly, that is, in a matter of a few hours. However, the hydration reaction of tricalcium silicate (II) takes up to 14 days and the hydration of dicalcium silicate (1) is substantially completed in 28 days. In this respect, the latter two reactions (I) and (II) never reach completion, but approach it assymptomatically. Considering the above reactions, it can be seen that cement is substantially fully cured in about 28 days, that is, most of the compounds present in cement are substantially hydrated in 28 days. Thus, in concrete mixtures, the concrete does not become substantially cured until 28 days after the initial addition of water to the concrete mixture.

Further, as is known, cured concrete does not reach its maximum tensile and other strengths until 90 days after the initial addition of water. On the other hand, the rapid hydration of some of the cementitious compounds in the concrete necessitates that the concrete be poured within a certain prescribed time period so that only a small proportion of the concrete is hydrated at the time the concrete is poured. If the concrete is poured after the prescribed time period, the final cured concrete will have inferior tensile strength and other properties which would not meet Federal and State requirements.

In present practice, the constituents of concrete are mixed either in a batching plant with water and poured into the truck as ready-mix, or dry ingredients are poured into the truck and water added in transit, for transit-mix concrete. However, any concrete which is not used within the prescribed time period (or which the customer has not accepted) has to be dumped. At the end of the day, the concrete-conveying truck has to be cleaned out and the concrete remaining in the truck has to be dumped. If this is not done, the concrete hardens in the truck and is difficult to remove. Accordingly, it is the present practice to dump fluid concrete, which has not been poured within a certain time limit or is unused at the end of a working day, into open fields. This results not only in considerable waste but, also, presents a problem with respect to finding open areas into which to dump unused concrete. This further results in cement-laden water being dumped into navigable streams and waterways. Returning clean water to streams is most important. This latter problem is especially serious in cities, where open areas are a premium. Additionally, in large cities, the concrete must be transported over a considerable distance before it can be dumped. This is particularly expensive since concrete is a heavy and bulky composition. The composition of a typical cubic yard of concrete is as follows:

cement — 600 lbs.
water — 300 lbs.
sand — 1,200 lbs.
gravel — 1,800 lbs.

As can be seen, most of the weight of the concrete is due to the sand and gravel, and only a small percentage of the overall weight is due to the cement. Further, the cement is the only component in concrete which undergoes reaction. Therefore, the disposal of unused concrete would be much more economical and simple if the sand, gravel and water were to be removed from the concrete. If this is done, only the cement needs to be dumped. Furthermore, the reclamation of the sand and gravel would result in substantial economies, as well as reducing the cost of dumping the unused concrete.

In view of the foregoing, it is an object of this invention to provide a new process for reducing the cost of dumping unused fluid concrete.

Another object of the invention is to provide a new process for the reclamation of sand and gravel from unused fluid concrete.

A further object of the invention concrete by to provide a new process for processing unused fluid concrete by forming the same into a slurry which may be reused.

Yet another object of the invention is to eliminate water pollution since, as a result of the new and improved process, the water disposed of is free from the ingredients of concrete.

Still other objects and advantages of the invention will in part be apparent and will in part appear hereinafter.

In accordance with the process of this invention, water is added to a fluid concrete mixture to form a very fluid concrete slurry. The slurry is then passed over at least one vibrating gravel screen to separate the gravel out on the screen and allow the cement and sand slurry to pass therethrough. The gravel is washed, then taken by conveyor or similar means from the gravel screen to a storage bin and the slurry is passed over a vibrating sand screen to separate the sand out on the screen and allow the cement slurry to pass therethrough. The sand so separated is washed and taken by conveyor or similar means from the second screen to a storage bin where it may be reused in the formation of new concrete. The cement slurry can then be passed to a mechanical separator, settling basin or tank, where the bulk of the water may be separated from the cement. The water so separated is recycled and added to new fluid concrete introduced into the process.

The invention accordingly comprises the several steps and the relation of one or more of such steps with respect to each of the others and the apparatus embodying the features of construction, combination of elements and arrangement of parts which are adapted to effect such steps, all as exemplified in the following detailed disclosure, and the scope of the invention will be indicated in the claims.

For a fuller understanding of the nature and objects of the invention, reference is had to the following description, taken in connection with the accompanying drawings, in which FIG. 1 is a schematic diagram of one embodiment of the process;

FIG. 2 is a schematic diagram of an alternate embodiment; and

FIG. 3 is a schematic diagram of still another embodiment.

Referring to FIG. 1, a truck carrying a fluid concrete mixture backs up to a ramp 10 and dumps its load of concrete into a receiving hopper 11. Water passing through a standpipe 12 and a hose 13 is used to fluidize and wash out the concrete from the receptacle on the truck into the hopper 11. A row of sprays 14 is located in the hopper 11 to ensure that the concrete slurry does not stick to the hopper but flows easily therethrough. In order to form a sufficiently aqueous concrete slurry for processing according to this invention, generally a total of 800 to 2,400 lbs. of water and, preferably, 1,000 to 1,800 lbs. of water must be added to the receptacle on the truck and through hopper sprays 14 to about every 3,500 to 4,500 lbs. of fluid concrete which is to be processed. It is preferred that the fluid concrete mixture be dumped into a receiving hopper, since such a hopper facilitates the transfer of the slurry to the next stage of operation. However, other means which accomplish the same result may be used for this purpose.

Thereafter, the concrete slurry is allowed to pass by gravity from hopper 11 to the top of a screen 15 which is generally vibrating and which has a mesh size dictated by the size of the aggregate which is to be retained. Although only one screen is shown, it should be understood that two or more screens may be used to separate out different-size gravel, when more than one size gravel is used to form the concrete. For most types of concrete mixtures, the screen openings will be in the range of 0.25—1.25 inches. Substantially, all of the gravel in the usual concrete mixture is retained on the screen while allowing the water, cement and sand to filter therethrough. Water is added to the concrete slurry on the screen 15 preferably through manifold sprays 15a so as to wash the gravel and facilitate the filtration of the sand and cement through the screen. As a result of the vibration of the screen, as well as the fact that the screen is tilted at a slight angle to the horizontal, the gravel on screen 15 passes to a chute 16 and down to a conveyor 17 into a gravel storage bin 17a for reuse in preparation of new concrete. It should be understood that, when more than one screen is used, there will be a separate conveyor for each screen so as to convey the different-size gravel to separate storage bins. The water, cement and sand which pass through the screen 15 fall onto a second screen 18 which is generally vibrating. The screen 18 is placed directly below the first screen 15, so that no conveying means are needed to convey the slurry from the first to the second screen and, further, to conserve space. Water is added to the slurry on the screen 18 through a second set of manifold sprays 18a located over the screen 18 to wash the sand and facilitate the filtration of the cement slurry through the screen.

The mesh size of the screen 18 is dictated by the sand particle size used in the mix. For most concrete mixtures, the mesh size will be in the range of 20—200 mesh per sq. in. Substantially, all of the sand in the concrete mixture is retained on the screen while the cement and water filters therethrough. Since the vibrating screen 18 is tilted at a slight angle to the horizontal, the sand retained thereon passes by gravity through a chute 19 located below the chute 16 and along a conveyor 20 into a sand storage bin 21 for reuse in the preparation of new concrete. Conveyors 17 and 20 may be powered or may simply be an extension of chutes 16 and 19, respectively, so that the sand and gravel will pass down the chutes by gravity. The cement and water slurry which filters through the screen 18 falls into a spillway 22 inclined to the horizontal, so that the slurry flows down the spillway 22 into a settling basin 23. The inclination of the spillway and it sizes are dictated by the quantity of cement-laden water to be processed per unit time, so as to have sufficient velocity and such that the cement does not settle in the spillway.

Baffles 24 are placed in the settling basin 23 so that the slurry must travel a long path at a low velocity in passing through the settling basin to allow the cement to settle to the bottom of the basin. The length of the flow path is dictated by the particle size, flow rate and settling rate of the particles. If it is desired to draw off a portion of the cement slurry, a line 25 may be placed in the spillway or in the first part the settling basin, as shown in FIG. 1. A portion of the slurry can then be pumped from the basin by means of a pump 26 through line 25 and another line 27, to a storage tank or directly to the tank in which the new mixture of concrete is being prepared. At the end of the settling basin, the clear water continually overflows into a pump station 28 where it is removed by a pump 29 and recycled through lines 30, 30a, 30b 30c and 30d, for reuse in the hopper and manifold sprays 14, 15a and 18a. Part of the water recycled through the line 30 may pass through the line 30c so that it may pass out through the standpipe 12 and hose 13. If additional water is needed, it may be added through a line 31 into pump station 28. The additional water is generally added in the startup of the process. Further, if there is an excess amount of water, that is, more than is required for sprayers 14, 15a and 18a, the excess may be passed out of the settling basin, through an overflow line 32, and dumped accordingly. This is acceptably clean water.

When the settled cement has reached a certain level in the basin the process is stopped and the cement may be scooped out by any convenient means, placed on trucks and transported to a dumping area. Since there is a large amount of water in the basin, the cement does not harden to the point at which it is difficult to remove. Thus, even after a period of 28 days, the cement in the basin still has the viscosity of mud and can be removed.

At the present time little use is being made of the cement slurry which passes down the spillway 22. However, for certain types of concrete, such slurry mixture can be added as a water replacement to the dry concrete mixture to prepare new cement. It is also probable that, in the future, it will be normal to reuse the cement slurry as cement and water in the formation of new concrete.

It is to be understood that the process of this invention can be used with any type of means for dumping fluid concrete into the hopper. Further, the process of this invention may only be used with fluid concrete, that is, concrete which has not set to the point where it cannot be slurried with water. For the purposes of this invention, a concrete mixture remains fluid for up to about eight hours after the initial addition of water to the concrete mixture.

While the above-described process is the most economical and is the preferred embodiment of this invention, it should be understood that this embodiment is preferred only where there is adequate space for the settling basin. As can be seen, in order for the settling basin 23 to accomplish its function of allowing the cement to settle from the slurry, it must be relatively large with respect to the size of the other apparatus used in the process. Generally, in a system which can process 40 tons of concrete per hour, the settling basin should have an area of at least about 80 square yards If the site is in a congested area where space presents a problem, it is desirable to settle out the cement from the slurry by means which require less physical space.

Such alternate means are shown in FIG. 2, and, as with the embodiment of FIG. 1, in this embodiment the cement slurry passes down a spillway 22 into a sump station 33. The slurry is then pumped through lines 35 and 36 by a pump 34. An aqueous suspension of a suitable flocculating agent which mixes with the slurry and accelerates the precipitation of the cement from the water, is added to the slurry passing through line 36. Any known flocculating agent may be used, such as alum, organic polyelectrolytes, arabic gum, protein derivatives, anionic calcium salts, and others. Organic polyelectrolytes such as anionic polyacrylamides of high molecular weight are manufactured by Borden Inc., 350 Madison Ave., New York, N. Y., under the name of Special Flocculating Agents.

A thick aqueous suspension of the flocculating agent is preferably prepared in a tank 37. A pump 38 forces a metered amount of the flocculating agent suspension through lines 39a and 39b into the line 36, so that it mixes with the cement slurry. The flocculating agent suspension, containing usually a 2 percent solution of flocculating agent, is added to the cement slurry at a ratio of from two-tenths of 1 percent to 95 percent. The combined cement slurry and flocculating agent suspension is pumped through a two-way valve 40 into either of lines 41 or 42. The valve 40 will be closed as to one line so that the cement slurry may pass through one of the lines into either of settling tanks 43 or 43a. Assuming that the valve 40 is so closed and that the slurry is passing through line 41, it will flow into settling tank 43 where the cement will be allowed to settle from the slurry. Usually, after 12 hours, most of the cement settles out of the water to the bottom of the tank while the clear water remains on the top. Thus, during one day's operation, the cement slurry is pumped to a single settling tank 43. In the operations of the following day, the cement which has settled to the bottom of the tank 43 may be dumped into a truck or other transporting means through a valve 44, leaving clear water in the tank. Then, during the day's operations, the valve 40 is adjusted so that the cement slurry will be pumped through line 42 into settling tank 43a and the clear water in tank 43 is used to supply the sprayers 14, 15a and 18a.

Lines 46 and 47 pass clear water from settling tanks 43 and 43a back to sprayers 14, 15a and 18a. When the tank 43 contains clear water, two-way valve 45 is adjusted so that clear water is recycled from tank 43 at a predetermined rate through lines 46 and 49 by pump 48. The water then passes through line 50 for recycling to the sprayers 14, 15a and 18a. Unless the day-to-day amounts of concrete processed vary a great deal there should be sufficient water in tank 43 to provide all the water requirements for the sprays 14, 15a and 18a in a day's operation. However, as required, makeup water may be provided by means of line 51 passing into line 49 so that water may be pumped to the sprayers. Further, each tank has an overflow line, 52 and 53, for leading off excess water or slurry. Settling tank 43a is also provided with a valve 54 for dumping the settled cement onto trucks or other transporting means.

The positions of the tanks are alternated in each day's operations, so that the tanks are used alternately for settling and for feeding clear water to the sprayers. With this alternate use, a line and pump may be provided for removing some of the cement slurry from the spillway, as in FIG. 1, so that the slurry may be used in preparing concrete.

Although the equipment for the embodiment of FIG. 2 is more expensive than that of the embodiment of FIG. 1, this embodiment has the advantage of occupying considerably less area. Accordingly, the settling tanks may be of cylindrical form with relatively narrow diameters and long lengths, thereby occupying considerably less area than the settling basin of FIG. 1. For an operation in which 20 cubic yards of fluid concrete are processed per day, the tanks need to have a volume of at least 20,000 gallons. A further distinct advantage of this alternate embodiment, is that the cement is very simple to remove from the tanks without the use of digging or dumping equipment.

Still another embodiment of the process of the present invention is illustrated in FIG. 3. In this embodiment, a substantially smaller apparatus is used to separate the cement from the concrete. This embodiment is particularly advantageous for use in large cities or congested areas, where space is at a premium. As with the embodiment of FIG. 1, the cement slurry passes down spillway 22 into sump station 55. A pump 56 passes the slurry through lines 57 and 58 into a mechanical separator 59. The separator 59 may be any type which centrifuges the cement particles against the walls of the separator, such that they collect at the bottom of the separator and are continuously taken out through a valve 60. The cement may be dumped into any conveying means and carried away, as has been explained previously. The clear water from separator 59 is pumped back through lines 61 and 62 by means of a pump 63 to the sprayers 14. Makeup water may be added as needed through a line 64 and excess water may be removed through a line 65. Again, as with the embodiment of FIG. 1, a line and pump may be provided to remove a portion of the slurry from the spillway 22 for use in preparing a new mixture of concrete.

The cost of operation of the mechanical separator 59 is considerably higher than that of settling tanks or settling basins. However, the separator is preferred where space is at a premium since it occupies a very small area in comparison to the other structures. The separator does not store any of the slurry but continuously operates to separate the water from the cement.

It can thus be seen that this is a novel process, having a number of important advantages. It permits reclamation of the sand and gravel in unused concrete, resulting not only in a substantial saving in the producing of concrete but, also, substantially reducing the amount of material which has to be dumped. Further, the material (wet cement) which is dumped in this process is considerably easier to handle than concrete. Additionally, it is expected that a good portion of the cement which is dumped at the present time will, in the future, be reused as cement slurry, resulting in further economies and benefits.

It will thus be seen that the objects set forth above, among those made apparent from the preceding description, are efficiently attained and since certain changes may be made in carrying out the above process and in the construction set forth, without departing from the spirit and scope of the invention, it is intended that all matter contained in the foregoing description and shown in the accompanying drawings shall be interpreted as illustrative, and not in a limiting sense.

What we claim is:

1. A process for reclaiming sand and gravel from a fluid concrete mixture, comprising
   a. adding water to the fluid concrete mixture to form a concrete slurry,
   b. screening the concrete slurry over at least one vibrating flatbed screen to separate out the gravel on said screen and allow the cement and sand slurry to flow therethrough,
   c. screening the cement and sand slurry over a vibrating flatbed screen to separate out the sand onto the screen and allow the cement slurry to flow therethrough, and
   d. passing the cement slurry to a separating means consisting of a mechanical separator, settling basin or a tank to separate the bulk of the water from the cement.

2. A process in accordance with claim 1, further including recycling the water removed from the cement slurry to the fluid concrete mixture being processed.

3. A process in accordance with claim 2, further including washing the gravel on said gravel screen and transmitting the gravel by conveyor means from the gravel screen to a storage bin.

4. A process in accordance with claim 3, further including washing the sand on said sand screen and transmitting the sand by conveyor means from the sand screen to a storage bin.

5. A process in accordance with claim 1, further comprising passing the cement slurry over a settling basin having baffles therein whereby the slurry travels at a slow speed over a long path in the basin to permit the cement to settle to the bottom of the basin before the water passes out of the basin.

6. A process in accordance with claim 5, wherein a portion of the clear water from the settling basin is recycled to the fluid concrete mixture introduced into the process, and the remainder of the clear water is passed from the settling basin for disposal.

7. A process in accordance with claim 1, wherein said separating means comprises a settling tank and the cement slurry is kept therein for a time sufficient to permit the cement to separate from the water to form a clear water layer and a cement layer.

8. A process in accordance with claim 7, further comprising removing the cement layer from the settling tank by gravity through a valve in the tank and recycling the clear water in the tank to the fluid concrete mixture introduced into the process.

9. A process in accordance with claim 1, wherein said separating means comprises first and second settling tanks and the cement slurry is alternately passed to each said settling tank so that the cement may settle out and, simultaneously, recycling the clear water from the settling tank, in which the cement has settled out, to the fluid concrete mixture introduced into the process.

10. A process in accordance with claim 1, wherein separating means comprises a mechanical separator which continuously separates the cement from the water, the clear water formed in the separator is recycled to the fluid concrete mixture introduced into the process, and the cement separated out in the separator is dumped.

11. A process in accordance with claim 1, wherein a portion of the cement slurry is transmitted to a storage tank for use in the formation of concrete.

12. A process in accordance with claim 1, wherein a portion of the cement slurry is transmitted to a concrete mixing unit for use in the formation of a new concrete mixture.